(12) United States Patent
Needham et al.

(10) Patent No.: US 11,209,337 B1
(45) Date of Patent: Dec. 28, 2021

(54) SYSTEM AND METHOD FOR FLEXIBLE SOLAR TRACKER AND TESTING

(71) Applicant: FCX Solar LLC, Mont Vernon, NH (US)

(72) Inventors: Christopher Thomas Needham, Mountain View, HI (US); Frank Carl Oudheusden, Mont Vernon, NH (US)

(73) Assignee: FCX Solar LLC, Mont Vernon, NH (US)

( * ) Notice: Subject to any disclaimer, the term of this patent is extended or adjusted under 35 U.S.C. 154(b) by 0 days.

(21) Appl. No.: 17/365,986

(22) Filed: Jul. 1, 2021

(51) Int. Cl.
*G01M 9/06* (2006.01)
*G01M 9/04* (2006.01)

(52) U.S. Cl.
CPC ............... *G01M 9/06* (2013.01); *G01M 9/04* (2013.01)

(58) Field of Classification Search
CPC .......... G01M 9/04; G01M 9/06; G01M 9/062; G01M 9/02; G01M 9/065; G01M 9/08; G01M 9/067; G01M 17/007; G01M 9/00; G01M 10/00; G01M 15/02; G01M 17/0074; G01M 17/0072; G01M 99/00; G01M 1/22; G01M 15/14; G01M 17/00; G01M 5/0016; G01M 5/0066; G01M 1/122; G01M 1/28; G01M 1/30; G01M 1/36; G01M 11/083; G01M 11/088; G01M 13/027; G01M 17/0076; G01M 17/013; G01M 3/181; G01M 3/2838; G01M 5/0033; G01M 5/005; G01M 5/0083; G01M 7/02; G01M 7/022; G01M 7/025; G01M 7/04; G01M 7/08; G01M 99/004; G01M 11/30; G01M 13/00; G01M 3/20; G01M 3/202; G01M 5/00; G01M 99/002; G01L 5/1627; G01L 19/0007; G01L 19/0015; G01L 11/02; G01L 5/16; G01L 5/12; G01L 5/133; G01L 5/162; G01L 5/161; G01L 9/08; G01L 15/00; G01L 23/12; G01L 23/125;
(Continued)

(56) References Cited

U.S. PATENT DOCUMENTS

| 10,539,201 B2 * | 1/2020 | Griffin .................... F16F 7/104 |
| 2019/0253021 A1 * | 8/2019 | Needham ................ H02S 20/32 |

(Continued)

FOREIGN PATENT DOCUMENTS

KR         1858934 B1 *   5/2018          G01J 1/42

OTHER PUBLICATIONS

FTC Solar, Inc.; "Voyager Tracker"; DOC: 02-B-001-B; 2020; 2 pages.
(Continued)

*Primary Examiner* — Andre J Allen
(74) *Attorney, Agent, or Firm* — Perkins Coie LLP; Colin Fowler (57) ABSTRACT

Disclosed herein is a technique of configuring flexible photovoltaic tracker systems with high damping and low angle stow positions. Under dynamic environmental loads implementing a high amount of damping (e.g., greater than 25% of critical damping, greater than 50% of critical damping) or a very high amount of damping (e.g., 100% or greater of critical damping, infinite damping) enables the flexible tracker system to prevent problematic aeroelastic behaviors while positioned in a low stow angle. The disclosed technique is further applied to a prototyping process during wind tunnel testing.

21 Claims, 6 Drawing Sheets

(58) Field of Classification Search
CPC ....... G01L 5/168; G01L 9/0051; G01L 9/065;
G01L 1/24; G01L 19/0636; G01L
19/0654; G01L 19/147; G01L 23/10;
G01L 27/00; G01L 5/167; G01L 7/00;
G01L 1/086; G01L 1/148; G01L 1/16;
G01L 1/2206; G01L 1/2243; G01L
1/2268; G01L 1/26; G01L 11/04; G01L
13/02; G01L 19/00; G01L 19/003; G01L
19/0038; G01L 19/04; G01L 19/08; G01L
19/148; G01L 27/005; G01L 5/163; G01L
5/164; G01L 7/18; G01L 9/00; G01L
9/0002; G01L 9/0035; G01L 9/006; G01L
9/007; G01L 9/0077; G01L 9/10; G01L
9/12; G01L 1/2262; G01L 19/149; G01L
7/02; G01P 13/025; G01P 5/001; G01P
5/12; G01P 13/0093; G01P 5/14; G01P
5/00; G01P 13/02; G01P 5/10; G01P
3/806; G01P 5/02; G01P 5/16; G01P
1/006; G01P 5/01; G01P 13/006; G01P
13/008; G01P 15/00; G01P 21/00; G01P
3/263; G01P 3/42; G01P 3/48; G01P
3/486; G01P 5/04; G01P 5/086; G01P
5/20; G01P 5/24; G01P 13/00; G01P
5/005
USPC .......................................................... 73/147
See application file for complete search history.

(56) References Cited

U.S. PATENT DOCUMENTS

| | | | |
|---|---|---|---|
| 2021/0071914 A1* | 3/2021 | Worden | F24S 25/12 |
| 2021/0080345 A1* | 3/2021 | McGranahan | G01M 9/062 |
| 2021/0167721 A1* | 6/2021 | Chaouki Almagro | H02S 20/32 |
| 2021/0311507 A1* | 10/2021 | Needham | G01P 5/001 |

OTHER PUBLICATIONS

Bowman, Mitch et al.; "How Design of PV Trackers Accommodates Large-Format Modules"; https://www.greentechmedia.com/webinars/webinar/how-design-of-pv-trackers-accommodates-large-format-modules; GTM Webinar; Feb. 18, 2021; 3 pages.

* cited by examiner

SYSTEM AND METHOD FOR FLEXIBLE SOLAR TRACKER AND TESTING

TECHNICAL FIELD

The present application is related to solar tracker systems for solar panels.

BACKGROUND

Photovoltaic (PV) power systems frequently track the sun to various degrees to increase an amount of energy produced by the system. These trackers typically move photovoltaic modules to adjust an angle of incidence of the sunlight on the surface of the PV modules. In particular, trackers typically rotate the PV modules around an axis principally oriented north to south, tilting the modules to as much as 60 degrees towards the east and west and adjusting tilt within this range throughout the day. By tracking the position of the sun, PV power systems often produce 20-30% more energy than fixed-tilt systems.

A common configuration of horizontal single-axis trackers ("SAT") as described above includes a single actuator near the center of a row of PV modules, potentially with 80-120 modules tilted by a single actuator. The angle of tilt is defined by the position of the actuator, while a torque tube or other similar device transfers moments and positions the rest of the row at the tilt of the actuator. However, environmental loading (wind, snow, dead load, etc.) can twist portions of a row away from the intended tilt angle. These types of solar trackers are referred to as "flexible" within the industry in comparison to types that use an actuator on sufficient points along a solar tracker row to constrain maximum twist to less than 10 degrees delta measured along a given row. Solar trackers that exhibit meaningful twisting under wind loading require that both static and dynamic impacts be considered through wind tunnel testing. The combination of static and dynamic wind loading results in a total system wind loading. The twisting is typical of other types of flexible structures that deform under wind loading and is well studied in the industry through aeroelastic wind tunnel testing and related simulation modeling.

The prevailing technique for mitigating environmental load is through a high angle stow position with minimal damping of the solar tracker. A high angle stow position refers to positioning the panel more vertically than horizontally. The high angle stow reduces the potential of high dynamic wind loading.

When a new PV system project is developed, the system is tested in a wind tunnel to optimize the cost of components of the system as a function of the projected output of the system. Wind tunnel tests are either static or aeroelastic/dynamic.

The figures depict various embodiments of this disclosure for purposes of illustration only. One skilled in the art can readily recognize from the following discussion that alternative embodiments of the structures and methods illustrated herein can be employed without departing from the principles of the invention described herein.

DETAILED DESCRIPTION

Modern photovoltaic (PV) systems make use of high stow angles and low damping (e.g., less than 25% of critical damping, 3-15% of critical damping). Critical damping refers to an amount of damping applied to a given object such that there is no oscillation of the object (such as a PV panel) in response to a force on that object. Specifically, the object moves only as far as the force pushes and no further (e.g., the system reaches equilibrium and force is dissipated without oscillation).

"Critical damping" is an effect that may be achieved on the level of the solar tracker half-row (i.e. a "wing"). However, small sections of a few panels may oscillate far from the damper locations on such a row. These small oscillations do not drive the overall oscillation behavior of the entire wing and can be safely ignored.

For the purposes of this disclosure, "high damping" refers to more than 25% of critical damping, and "very high damping" refers to 100% of critical damping or greater (e.g., being overdamped). High damping is a relative term based on the context upon which damping is applied. Known prevailing systems do not use greater than 25% damping, thus damping greater than the prevailing systems is considered high. A system with high damping, but less than critical damping will eventually reach equilibrium, though will allow for oscillation. An overdamped system reaches equilibrium, as does critical damping, but after a longer period of time (and similarly without oscillation). "Infinite" damping refers to a fixed position.

"Partially locking" refers to dampers that have a variable damping ratio or stage change (i.e. a port that closes, but that does not hard lock). "Fully-locking" similarly refers to a damper with a stage change, but at least one stage implements an infinite damping ratio.

Increasing damping on a PV panel has a number of side effects. First, the force applied to the remainder of the panel structure is increased. Because force is not being expended moving/oscillating, the remaining structure must absorb the force. Examples of portions of the remaining structure with increased stresses include the bracketry attaching the damper to the torque tubes or rotating superstructure that supports the modules, any bolts that attach damper to brackets and brackets to torque tubes, localized wall stresses of the torque tubes themselves where bracketry attaches (for example, where a U-bolt may crush a thin-walled tube), and foundations that dampers/brackets attach to.

Accordingly, the remaining parts of the structural system are designed more robustly to withstand the shared environmental load. Notably, the forces on non-damping components such as the actuator itself are often reduced. Second, increasing damping on a given PV panel makes that panel more difficult to intentionally rotate for tracking the sun.

Flexible PV systems generally rely on as few actuators as possible (actuators are comparatively expensive parts). The ratio of actuators to panels is higher than in non-flexible systems. Non-flexible systems use more actuators in place of damping; however, the additional actuators increase the overall cost of the system.

For purposes of this disclosure a "flexible" solar tracker system is one subject to sufficient deflection as to require aeroelastic consideration. 10 degrees of absolute twist is a typical cut-off for when a static wind tunnel test report may be used without specific aeroelastic testing added in. However, the selection of 10 degrees of absolute twist is subjective on the part of the wind tunnel test facilities and allows for a buffer between when aeroelastic effects begin to dominate. Flexible tracker systems allow for deflection requiring aeroelastic consideration due to a relative lack of points of fixity along each row. Actuators generally act as points of fixity. Rows that have few (or a single) actuator or other point of fixity per panel/module are flexible.

In circumstances with permanent high damping, while the PV panels nearest to the actuator will position correctly, those panels that are further away from the actuator will be skewed based on the differences in torque at different distances from the actuator (via the torque tube). The skew will lead to panels shading adjacent panels and causing a decrease in efficiency.

Low damping (e.g., 10-15% of critical damping, less than 25%) is not sufficient to prevent torsional galloping or flutter on flexible solar tracker systems stowed at a low tilt angle under a design wind load. Dynamic loads propagate along a torque tube and cause galloping events that cause damage to the array. Thus, high angle stow (e.g., 60 degrees) is used to prevent galloping events. High angle stows may cause additional stresses to the system under static loads. Stowing flat has been the industry standard until recent years, since low angles are the best way to combat key static loads at high wind speeds. However, recent advancements to string length (e.g., the number of panels wired in series) have led to problematic aeroelastic behaviors for low angle stowing under dynamic stresses. Long strings (e.g., greater than 20 panels) are more flexible and more prone to torsional galloping and other effects.

Described herein are wind tunnel testing methods used in the design of a tracker system that is highly damped (25% critical damping to just under critical damping) or very highly damped (critical damping or greater) against rotation about a central axis when considering total system damping. Examples of total system damping factors include: component dampers, aerodynamic damping, damping due to friction, damping due to material strain, etc.

Common design practice to address dynamic loading is to perform wind tunnel testing with panel angles set at a high tilt angle under design wind loading (ex: >20 degrees from horizontal) to largely mitigate the hysteresis effects of flow separation. However, operation at high tilt angles can increase other types of measured pressures and thus cost when wind tunnel test results are applied to the design of a solar tracker system. In particular, static wind tunnel testing of solar tracker structures set at a high tilt will show significant increases in pressures measured. Thus, there is a trade-off inherent in optimizing wind stow tilt angles for flexible solar tracker structures when considering both static and dynamic wind load testing.

Solar tracker systems developed to date show a response time of rotation on the order of is or faster. The time of rotation is a function of the natural frequency (0.5~1.5 hz for $1^{st}$ order row rotation) and low total system damping. For this reason, the wind tunnel testing methods employed currently are easily separated into "dynamic" (aeroelastic methods) and "static" (rigid model methods) of wind tunnel testing. These two very different types of testing are then combined to determine a total system wind loading that can be considered to be the combination of a baseline static contribution and an additional dynamic wind loading effect. Up until the point of critical damping, total wind loading will not be less than a static wind loading test evaluated on a fully deformed structure and to a building code standard wind gust (for example 3 s gust from IBC/ASCE 7).

Wind tunnel testing of flexible solar trackers and their scale models at a low stow angle (ex: <20 degrees from horizontal) under a design wind loading can show significant aeroelastic behaviors when solar tracker systems exhibiting typical damping ratios below 15% are evaluated. These behaviors are commonly referred to as torsional galloping, stall flutter, divergence, and buffeting. The primary cause of torsional galloping or stall flutter behaviors is a hysteresis effect in flow attachment and separation that adds inertial energy to the rotating panel assembly under wind loading when trackers are wind tunnel tested at low stow angles. The low total damping common on these systems does not mitigate the energy gain on each cycle and thus aeroelastic behaviors are observed to increase. The whole of aeroelastic wind loading behaviors described is frequently referred to as "dynamic" wind loading. Common design practice to address dynamic loading is to perform wind tunnel testing with panel angles set at a high tilt angle under design wind loading (ex: >20 degrees from horizontal) to largely mitigate the hysteresis effects of flow separation. However, high tilt can increase other types of measured pressures and thus system cost when wind tunnel test results are applied to the design of a solar tracker system.

Wind tunnel testing of highly damped solar tracker models (greater than 25% or greater than 50% critical damping) makes it possible to mitigate the majority of undesired aeroelastic behaviors when tracker systems are stowed at a low tilt angle under design wind loads. Undesired aeroelastic behaviors are mitigated because the energy dissipated by the total system damping can equal or exceed the hysteresis effect of flow separation experienced over a given oscillation. Meaningful reductions in dynamic wind loading are measured with aeroelastic wind tunnel testing and analysis, up to approximately the point of critical total system damping.

By increasing total system damping of a wind tunnel tested PV tracker system model above critical, it is possible to dramatically lower the $1^{st}$ order damped natural frequency of the system such that the time to respond to a wind load is greater than the modeled building code wind gust duration time. By doing so, aeroelastic wind tunnel testing methods and related analysis will show that longer effective gust durations are required for the modeled system to achieve maximum deflections. As wind tunnel testing in a boundary layer implicates a turbulence intensity that matches that of the atmospheric boundary later, test model response rates greater than the shortest equivalent gust durations will result in lower deflections than for solar tracker system models with less than critical total system damping. This approach will result in a total wind loading (static+dynamic) than can be lower on critical system components than if the system was evaluated solely with a static wind tunnel test on a fully deformed structure for a building code standard wind gust duration. Lower total wind loading on the modeled system will result in reduced costs and increased reliability of full-scale PV system installations.

In some embodiments, the wind tunnel testing indicates at what threshold of wind strength the PV tracker system enters the stow state.

Figure 1:
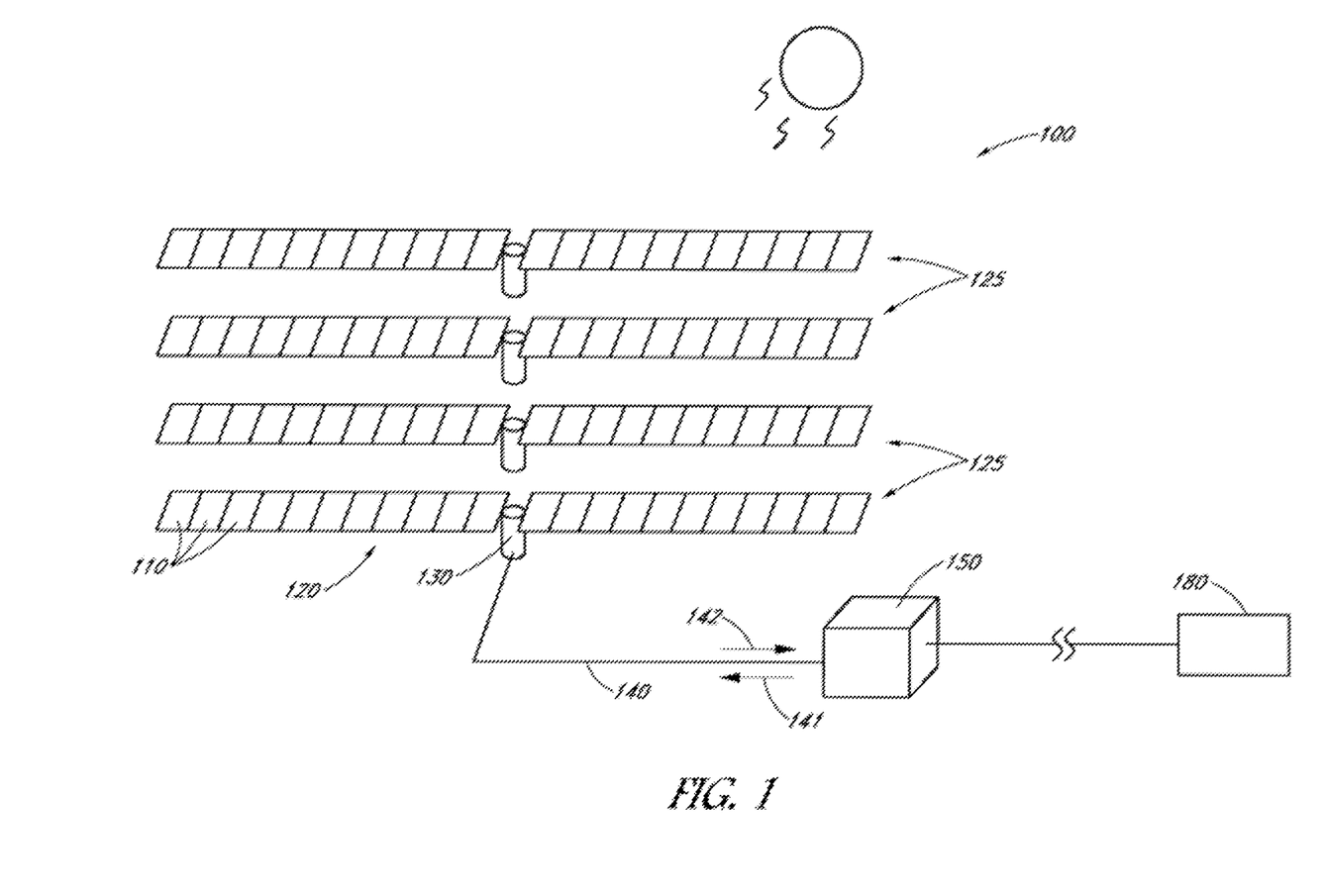
FIG. 1 shows a schematic view of an installed solar tracker system as may be employed in embodiments.

FIG. 1 shows a schematic view of an installed solar tracker system as may be employed in embodiments. A solar tracker system 100 may include individually-actuated PV string rows 125 installed in a predetermined location and orientation relative to the sun. Each PV string row 125 may include one or more PV panel strings 120. In some embodiments each string row 125 includes thirty PV panels 110 and four strings (e.g., for a total of 120 panels). For example, two or more PV panel strings 120 may be combined in a row and mechanically connected to a drive system of a corresponding PV string tracker module 130.

Furthermore, each PV string may include several PV panels 110 electrically connected in series. Thus, a PV string tracker nodule 130 may individually move a corresponding PV string row 125 to orient the PV panels 110 of the PV strings 120 as needed for effective system operation. For example, the PV string tracker module 130 may point the PV panels 110 toward the sun to maximize PV electrical generation during daytime, or the tracker module 130 may move the PV panels 110 into a stowed position, e.g., for nighttime or weather stowage. Accordingly, the tracker module 130 may require electrical power at all times, including daytime and nighttime.

In some embodiments, the tracker module 130 may be powered by forward-fed power 142 from a corresponding PV string, or the tracker module 130 may be powered by back-fed power 141 delivered from a station hub 150 of the solar tracker system 100. The forward-fed power 142 may correspond, for example, to a rated system power generated by the combined PV string rows. For example, the rated system power may include power supplied by the PV strings 120 to a power cable running between the PV string rows 125 and the station hub 150. The tracker module 130 depicted herein may include an actuator such as a rotational actuator. Other embodiments include linear actuators that may or may not be integrated into damper components. The form the actuator takes varies from system to system.

Each PV string 125 may be electrically connected in parallel with the other PV strings, and thus, the rated system power may have a rated system voltage corresponding to a rated voltage of the PV strings 125. In some embodiments, the actuator of the tracker module 130 is a 12-48V DC brushless motor that is powered off a small PV panel on the tracker row and/or off an integrated battery backup installed 1× per row. Other variations may tap off the string voltage.

FIG. 1 depicts a working system in the field. During wind tunnel testing a scale or full-size equivalent is tested. A solar test apparatus may replace a number of parts such as the panels 110 themselves. The purpose of wind tunnel testing is to identify the stresses on the system and thus a number of components are unnecessary for testing purposes. Testing apparatus includes an actuator of the tracker module 130, physical structure of the system 100 (e.g., a base, a torque tube, etc. . . . ) dampers (see FIG. 2), PV panels 110 or equivalents. In some embodiments, the actuator is modeled as a point of fixity on the test model. The test equipment may include equipment that measures the actual moment that the actuator would see in an aeroelastic wind tunnel test.

In some embodiments, reference to PV modules or panels 110 also refer to panel equivalents or to components affixed or coupled to panels or panel equivalents. Tracker systems are often manufactured or marketed independently from the panels 110 themselves. Wind tunnel tests are performed on systems 100 that do not include PV panels, but contemplate the inclusion of PV panels. References to components affixed or coupled to panels herein contemplate being affixed to brackets that affix to the panels and not necessarily to the panels themselves. To wit, such brackets are components that are stress tested during wind tunnel testing. These brackets are not specifically depicted in the figures because their appearance, implementation, and even existence thereof varies from system to system.

A given tracker and PV module system may connect the modules directly to the tracker without brackets. The direct connection is done by adding cost to the PV module frame to eliminate the bracket structure. For example, the PV module may be directly bolted to the torque tube with a u-bolt.

Figure 2:
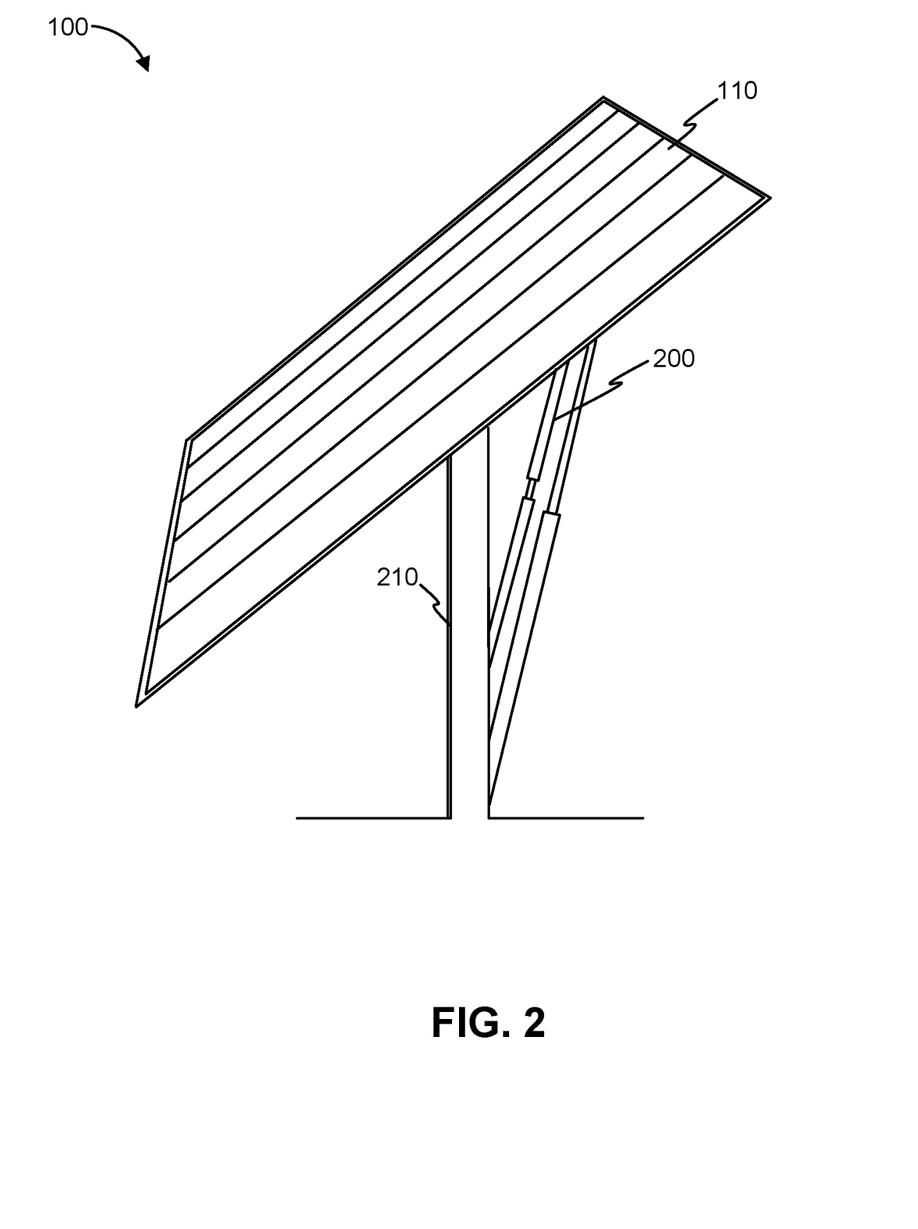
FIG. 2 illustrates a damper are positioned throughout the solar tracker system.

As shown in FIG. 2, a set of dampers are positioned throughout the solar tracker system. Along the string rows 125, a number of modules 110 include dampers 200 paired therewith. The dampers 200 affix between a base 210 of a given panel 110 or set of panels 110 and a panel 110 or brackets affixed thereto. The collection of PV modules 110 is rotatably anchored to a base 210. The amount of electricity produced by each photovoltaic module can be a function of at least the angle of incidence of light on the surface of the module, where more energy is captured when light is perpendicular to the surface (i.e., a zero-degree angle of incidence) than when light is incident at higher angles.

Increasing or decreasing the length of the linear actuator changes a tilt angle of the collection of PV modules 110 with respect to the base 210. Other types of actuators may be used in other embodiments. For example, the PV module collection 110 may be mounted on an axle and a rotary actuator may drive the axle to rotate the collection of PV modules 110 around an axis.

The damper 200 provides damping for the PV system 100, resisting movement of the PV modules 110 relative to the base 210. Damping by the damper 200 can mitigate dynamic wind loading or other vibrational loads applied to the PV system 100. Wind loading can induce motion in PV system 100, for example rotating the collection of PV modules 110 around the base at a velocity multiple orders of magnitude higher than the motion induced by the actuator. Although the damper 200 is shown in FIG. 1 as a component separate from the actuator for purposes of illustration, the damper 200 may be incorporated into or positioned concentric to the actuator.

The damper 200 has a variable damping ratio. A variable damping ratio avoids torsional issues resulting from over-damping such as skewed panels within the same string that shade one another. The damper 200 has at least a first damping ratio under a first operating condition and a second damping ratio under a second operating condition.

Different damping ratios are advantageous for different operating states. For example, a high damping ratio or very high damping ratio enables the damper 200 to dissipate more energy, and therefore better mitigates undesired oscillations of the PV system 100 under wind loading than a low damping ratio. A high or very high damping ratio also enables the damper 200 to bear a portion of the static load of the PV module collection 110 and dynamic loads caused by environmental conditions, reducing the load on the actuator. The high or very high damping ratio is present while the system is under stress of a wind flow, or other environmental stress exceeding a threshold value of force/speed.

However, a high damping ratio may cause the damper 200 to provide enough resistance to the movement of the actuator to cause the PV module 110 to twist away from its intended orientation. As a result of the modified angle of incidence caused by this "propeller effect," the collection of PV modules 110 may generate less electricity. If twisted more than a few degrees, operation of the collection of PV modules 110 may fall outside acceptable specifications.

A low damping ratio, in contrast, reduces the twist by providing lower resistance to movement of the actuator. Accordingly, while not under threshold environmental stresses, the damper 200 has a low damping ratio. Routine tracking behavior is performed while the damper 200 operates at the low damping ratio. The total system damping ratio is relatively low (e.g., sub-25% of critical damping) when the PV modules 110 move at low speeds relative to the base 210 (e.g., while the actuator is moving the collection of PV modules 110 without high environmental loading) and relatively high when the PV modules 110 move at higher speeds relative to the base (e.g., under dynamic wind loading). The higher damping ratio of the damper 200 enables the damper 200 to support a portion of the loading on the PV system 100, including the static load of the PV module collection (e.g., static wind loading) or dynamic loading caused by environmental conditions such as wind, snow, or dust. The lower damping ratio reduces the damper's resistance to movement caused by the actuator. The damping ratio of the damper 200 changes passively based on the operating state of the actuator, such as the actuation rate. The damping ratio is therefore adjusted without active control by, for example, the system controller.

As non-limiting examples of the operation of passive dampers, the damping ratio may passively change between relatively low damping and relatively high damping, or may passively change between relatively low damping and very high (or "partially-locking") damping, or may passively change between relatively low damping and "infinite" (or "fully-locking") damping, or may passively change between relatively high damping and very high (high and very high damping are "partially-locking") damping, or may passively change between high damping and "infinite" (or "fully-locking") damping, or may passively change between very high (or "partially-locking") damping and "infinite" (or "fully-locking") damping. As non-limiting examples of the operation of active dampers, the damping ratio may actively change between relatively low damping and relatively high damping, or may actively change between relatively low damping and high or very high (or "partially-locking") damping, or may actively change between relatively low damping and "infinite" (or "fully-locking") damping, or may actively change between relatively high damping and very high (consistently "partially-locking") damping, or may actively change between relatively high damping and "infinite" (or "fully-locking") damping, or may actively change between very high (or "partially-locking") damping and "infinite" (or "fully-locking") damping.

The high damping ratio has a value greater than 25% of critical damping, greater than 50% critical damping, or greater than 70% critical damping. A very high damping ratio has a value of 100% critical damping, greater than 100% critical damping, or infinite damping (such that the PV system 100 is overdamped).

Figure 3:
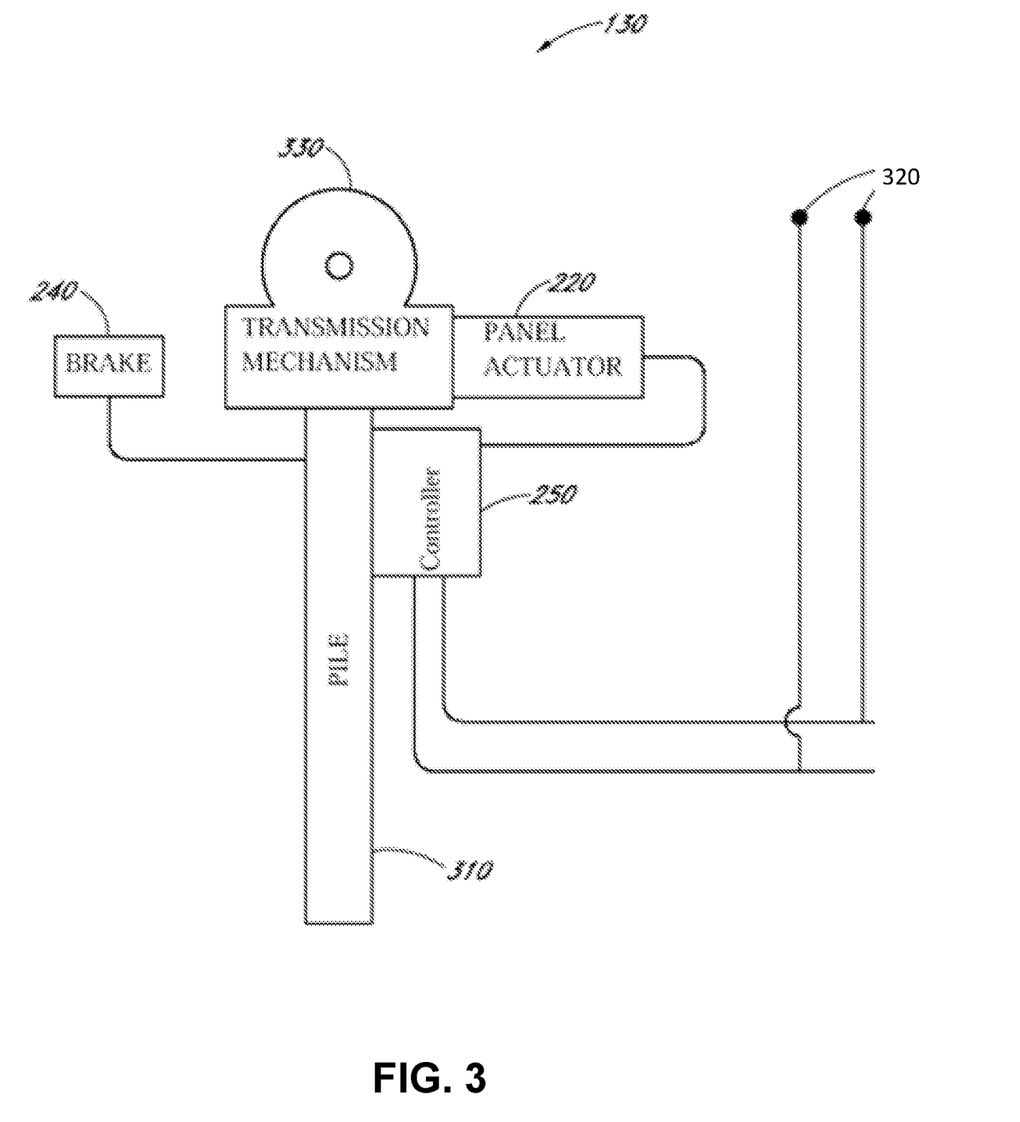
FIG. 3 depicts an embodiment of a PV string tracker module.

FIG. 3 depicts an embodiment of a PV string tracker module 130. the tracker module 130, panel actuator 220, PV string terminals 320, transmission mechanism 330, brake 240, pile/base 310, tracker controller 250, drive 340, sensor 350, and sensor lines 351 and 352. Notably, while actuator 220 is called out specifically, elements 330, 220, and 240 are commonly referred to, collectively, as the actuator. In some embodiments, the transmission mechanism 330 is self-locking while actuator 220 is not driving (like a worm gear) and the brake 240 is not required.

Drive 340 may be a transmission mechanism such as gears of a planetary gear set and may have other configurations as well. The sensor 350 may preferably be a hall effects sensor but may also be a shunt or have another configuration. The tracker module 130 may orient the corresponding PV strings as required for solar tracking and/or system stowage. Accordingly, the tracker module may include the pile 310 supporting a transmission mechanism 330, e.g., a slew drive, linkage, or other mechanical drive mechanism to convert mechanical power from the panel actuator 220 into movement of the PV string. The panel actuator 220 may be operatively coupled to the PV string through the transmission mechanism to affect movement of the PV string. The panel actuator 220 may be, for example, a linear or rotary actuator, such as an electrical DC motor, e.g., a DC stepper motor and may be sized for a 400 W or less back-fed power supply. Other sizes may also be used and may be sized to accommodate inverter capabilities from the system hub or central inverter. Some embodiments make use of more powerful motors, e.g., 10 kW.

The tracker module 130 may also include a brake 240 having a brake solenoid to limit movement of the panel actuator and/or the transmission mechanism. The panel actuator 220 may be operatively coupled to the tracker controller 250 in that the tracker controller 250 may provide electrical power and/or electrical signals to drive the panel actuator 220. Accordingly, the tracker controller 250 may serve as an electrical or control interface between the tracker module 130 and the other components of the solar tracker system 100. The tracker controller 250 may also be used in commissioning. Default safety modes may also be performed by the tracker controller 250. For example, loss of communications and fault sensing may trigger the controller 250 to place the PV string in stow mode.

During nighttime the tracker controller 250 may be dormant as little if any nighttime movement may be preferably performed. However, when nighttime movement is to be performed, the controller 250 may serve to energize back-fed power through communications with the station hub 150 or other component of the system 100. A "wake-up" message may be sent by a controller 250 to other controllers 250 over power lines or wirelessly and may also be sent to other components of the solar tracker system 100 over power lines or wirelessly. This movement may be choreographed and staged to stow the system The tracker controller 250 may include controller terminals 320 electrically connected to conductors of the power cable at the power junction. Similarly, the tracker controller 250 may be electrically connected in parallel with the PV string. For example, the conductors leading from the controller terminals to the power junction may also be joined with respective PV string terminals of the PV string.

In some embodiments, every tracker controller of the solar tracker system may receive power from the PV strings in parallel. That is, several PV strings in a PV string row may be connected in parallel with each other and to the PV string terminals. Thus, even if one PV string in the PV string row fails, the tracker controller 250 may still receive power from the PV string terminals and/or the power junction. The tracker controller 250 may be electrically connected in parallel with the PV strings in numerous configurations, as described below.

Figure 4A:
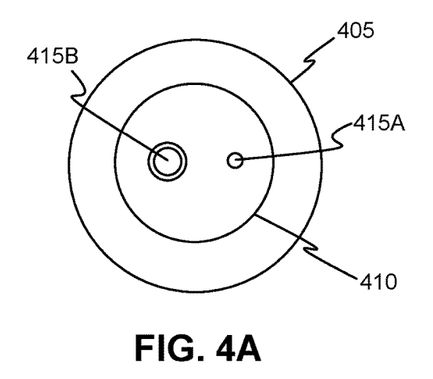
FIGS. 4A-4C illustrate an example damper with a variable damping ratio.
Figure 4B:
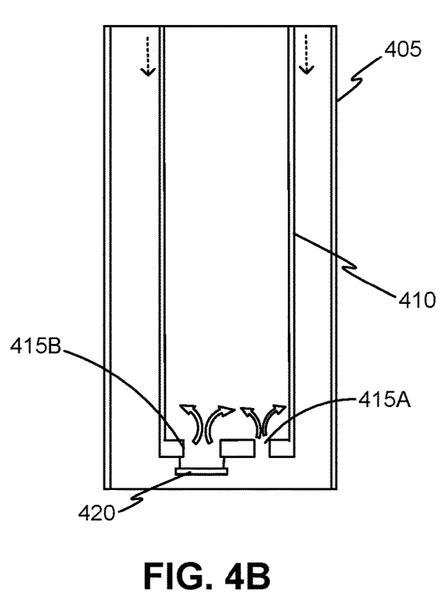
Figure 4C:
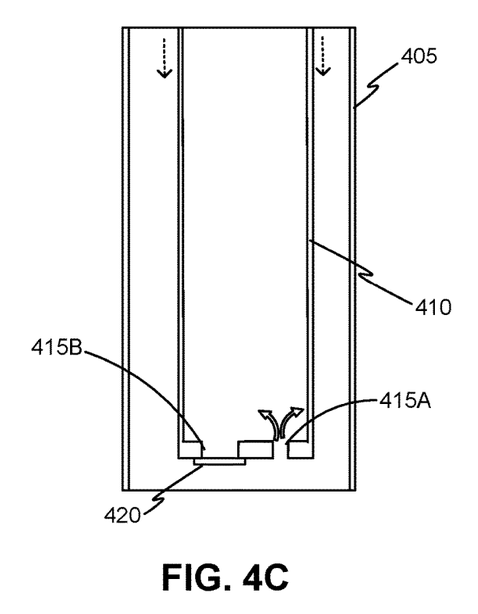

FIGS. 4A-4C show one example damper 200 having a variable damping ratio. FIG. 4A is a bottom cutaway view of the damper 200, while FIGS. 4B-4C are a side cutaway view of the damper. The depicted damper includes a damper piston 410 that moves through fluid contained in a damper chamber 405. The damper chamber 405 includes any fluid or mixture of fluids based on a desired variable damping ratio. Examples include, air, water, oil, or non-Newtonian fluids. The damper piston 410 includes two ports 415 that, when open, allow fluid to flow between the damper piston 410 and damper chamber 405. The ports 415 are shown in FIG. 4A as openings in a bottom end of the damper piston, but the ports can be located anywhere in the damper piston.

In other embodiments a two-chamber design is implemented whereby one chamber is in front of the end of the piston 410 and the other chamber is the trailing edge of the piston 410. Valves are formed on a plunger device on the piston 410.

The two ports 415 can include at least one smaller diameter port 415A and at least one larger diameter port 415B. The larger diameter port 415A is governed by a pressure valve 220. When the pressure valve 220 experiences high pressure the value seals and the fluids are forced only through the small diameter port 415A.

When the damper piston 410 moves through the fluid at low speeds (e.g., while the PV modules 110 are rotated at a low speed by the actuator 220), the fluid flows freely through both the large diameter port 415B and the small diameter port 415A where there is comparatively little resistance to the movement of the piston. Conversely, when the pressure valve 220 is sealed, fluid only (or primarily) passes through the small diameter port 415A. The reduced port area reduces the speed at which the piston 410, and therefore the damper 200 compresses.

In some embodiments, there are three or more varied damping ratios. A first low damping ratio corresponds to routine tracking behavior. Remaining damping ratios correspond to varied thresholds of force applied by environmental loading. Each progressive threshold of force corresponds to a greater damping ratio.

FIG. 4B illustrates an example of the piston 410 moving at a low speed through the fluid. As shown in FIG. 4B, the valve 420 is open and fluid can pass through the larger diameter port 415B to flow into or out of the damper piston 410. At higher speeds, the valve 420 is pushed closed and the fluid is only (or primarily) forced through the smaller diameter port 415A. The resistance provided by the fluid flow through the small diameter port 415A increases the effective damping ratio of the damper 200.

FIG. 4C illustrates an example of the piston 410 moving at a high speed through the fluid. As shown in FIG. 4C, the valve 420 is closed and fluid is only (or primarily) forced through the smaller diameter port 415A to flow into or out of the damper piston 410. Other embodiments of the damper 200 are feasible. The disclosed damper operates based on a premise of passively controlled fluidways that vary in diameter as a result of loads applied to the damper 200. For example, valves may regulate fluid flow through multiple equally or differently sized ports in the damper piston. At lower speeds, the valves are open to allow the fluid to flow through several or all of the ports. At higher forces applied, the valves close the port and force the fluid to flow through a smaller number of ports.

In some embodiments, additional all ports/fluidways close at a threshold applied force. As another example, the damper 200 may include a non-Newtonian fluid that has lower viscosity at low piston speeds and higher viscosity at high piston speeds.

In some embodiments, the PV system 100 is designed based on wind speed in the area where the system is installed. In particular, the PV system 100 may be designed to withstand expected peak loads from the area's wind conditions following a protocol such as ASCE 7. Similarly, the tests performed in a wind tunnel are often selected based on the expected environmental conditions at the installation site.

Figure 5:
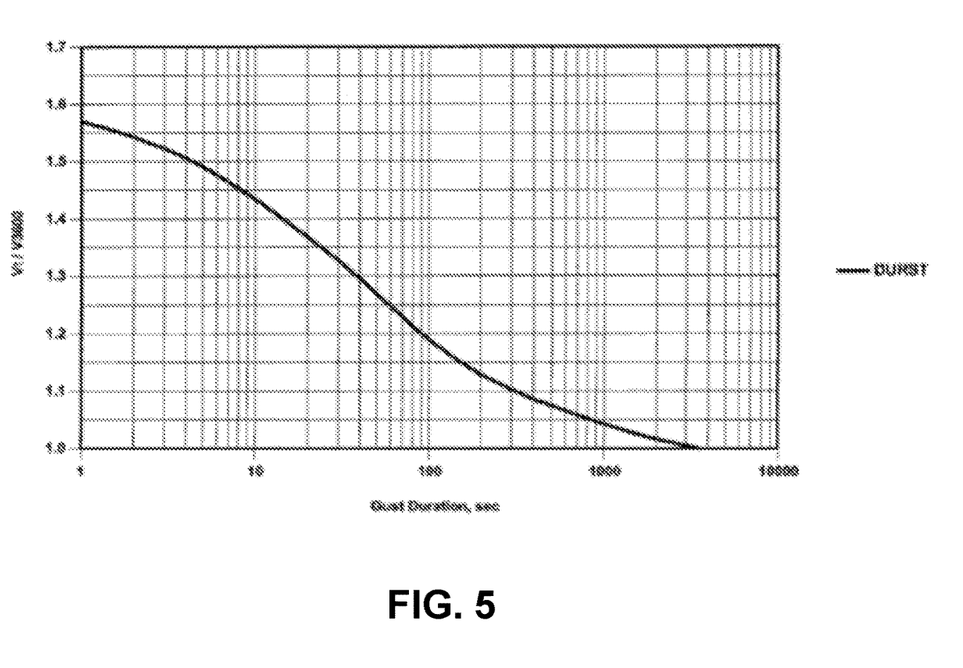
FIG. 5 illustrates an example Durst curve.

FIG. 5 illustrates an example Durst curve, which relates average wind speed to gust duration, that may be used in such protocols. As shown in FIG. 5, average wind speeds are higher for shorter measurements of gust duration than for longer measurements. Because the damper 200 has a higher damping ratio under wind loading and bears a portion of the load on the collection of PV modules 110, the PV system 100 may be designed based on longer gust durations—and therefore lower wind speeds—than photovoltaic systems lacking the damper 200. Furthermore, while the Durst curve shown in FIG. 5 assumes free, unobstructed wind speed, the PV system 100 will likely experience turbulent air flow as dynamic winds move around the structure. The average moments on the PV system 100 under turbulent flow may be even lower across longer gust durations than predicted by the Durst curve. Accordingly, at least one of the bases 210, the actuator 220, and the PV modules 110 are designed to withstand an average value of moments applied to the PV system 100 across a specified duration of time. The duration of time can be calculated based on wind tunnel testing, and can be, for example, approximately equivalent to a response time of the PV system 100 under target environmental loads. The design for lower wind speeds may reduce the amount of material used to construct the base 210, the actuator 220, and the collection of PV modules 110, and may reduce overhead and maintenance costs for the PV system 100.

In some embodiments, the higher damping ratio of the damper 200 is designed under wind tunnel testing to achieve a specified response time of the PV system 100 under high environmental loads. Because the higher damping ratio resists movement of the actuator 220, it may take longer for the actuator 220 to move the PV modules 110 to a specified angle under the higher damping ratio than under the lower damping ratio. The higher damping ratio can be selected such that the movement of the PV modules 110 through a designated angular distance (relative to the base 210) will take a specified amount of time if the PV system 100 is subjected to a specified amount of wind loading that is enough environmental loading to cause the damper 200 to transition to the higher damping ratio. For example, the higher damping ratio can be selected under wind tunnel testing such that the actuator moves the PV modules 110 thirty degrees relative to the base in 60 seconds while the PV system 100 is subjected to a specified amount of wind loading above a threshold wind speed. The higher damping ratio can be selected to allow faster or slower movements of the PV modules 110, such as 10 seconds, 30 seconds, or 120 seconds.

Figure 6:
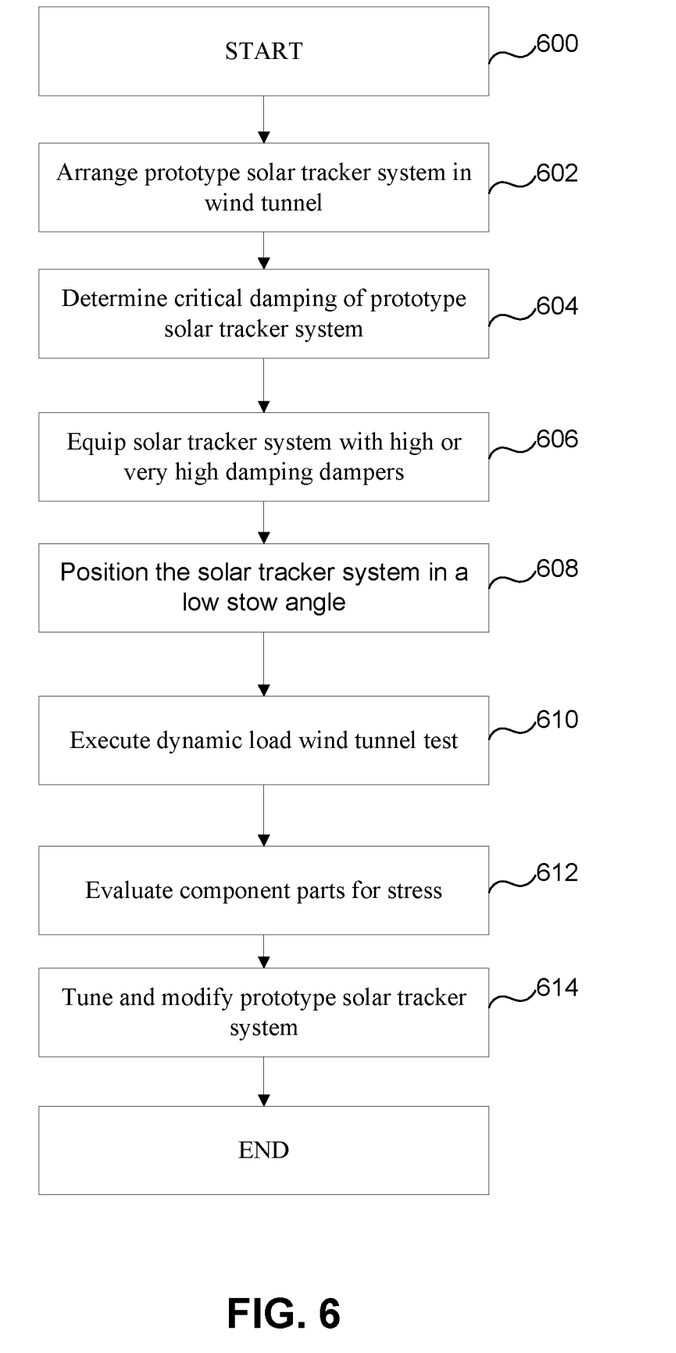
FIG. 6 is a flowchart illustrating a method of conducting a wind tunnel tests under high damping or very high damping.

FIG. 6 is a flowchart illustrating a method of conducting a wind tunnel tests under high damping or very high damping. In step 602, a prototype tracker system is arranged within a wind tunnel. The prototype tracker system is of a flexible design, and thus including few actuators as compared to the number of panels. In step 604, the value of total system damping is determined. Methods for determining total system damping include performing pluck tests, computing numerically via physics models, or conducting multiple preliminary rounds of wind tunnel testing.

In step 606, the prototype tracker system is equipped with high damping or very high damping dampers. The number of dampers is based on the total number of panels, the weight and ancillary damping properties of the system, the damping provided by each damper, and the environmental load for the given test as well as other factors.

In step 608, the prototype tracker system sets the available panels to a low stow angle (e.g., within 10 or 20 degrees of parallel to the ground). In step 610, the wind tunnel executes a dynamic load test. A given test may result in acceptable aeroelastic behavior, or unacceptable aeroelastic behavior. In response to a test with acceptable aeroelastic behavior, in step 612, the component parts are evaluated for stresses. Components of the prototype tracker system are modified seeking optimization of the cost of the system based on estimated output. The stress applied to the prototype is based on the amount of damping used in the given test.

In step 614, the prototyping endeavor tunes or modifies components and/or damping of the prototype system prioritizing reducing the overall cost of the system, while maintaining acceptable aeroelastic behaviors during the tests. Where high damping imputes more stress on the remaining system, more robust components are used to compensate. In some circumstances more robust components cost more.

Total system damping ratio is a function of multiple variables that change across projects as well. Some of more significant variables include natural frequency of the 1st mode of rotation, peak twist (amplitude), and changes in damping due to non-damper components (like say how much bushing friction occurs or how much aerodynamic damping occurs). It is very likely that no two projects will have the exact same damping. All of the above variability is considered by the bounds that are placed on the system design by the dynamic wind tunnel test. In most circumstances, it is not possible to change a system parameter (e.g., using a thicker walled torque tube) and not change total system damping.

In a given example, a tracker prototyping effort tunes the actual damper component directly in response to a first dynamic test. That is, they may test 50% total damping and choose to increase that value to 100% in response to a test round.

Other Considerations

The foregoing description of various embodiments of the claimed subject matter has been provided for the purposes of illustration and description. It is not intended to be exhaustive or to limit the claimed subject matter to the precise forms disclosed. Many modifications and variations can be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art can appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods can vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it cannot have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method of prototyping a solar tracker in a wind tunnel comprising:
   determining total system damping of a flexible solar tracker system when measured under peak design wind loading;
   configuring the flexible solar tracker system in a wind tunnel, the flexible solar tracker system having total system damping ratio against row rotation greater than 25% of critical damping when measured under peak design wind loading and the flexible solar tracker system arranged in a low angle stow position; and
   in response to said configuring, executing a dynamic loading wind tunnel test on the flexible solar tracker system.

2. The method of claim 1, further comprising:
   in response to said executing, selecting the total system damping ratio against row rotation based on results of the dynamic loading wind tunnel test.

3. The method of claim 1, further comprising:
   in response to said executing, modifying structural components of the flexible solar tracker system based on results of the dynamic loading wind tunnel test.

4. The method of claim 1, wherein the low angle stow position is less than 20 degrees from horizontal plane.

5. The method of claim 1, wherein said determining total system damping is based on any of:
   a pluck test;
   a predictive model; or
   previous wind tunnel tests.

6. The method of claim 1, wherein the total system damping ratio is critically damped.

7. The method of claim 1, wherein total system damping ratio is overdamped.

8. The method of claim 1, wherein measurements of loading into a damper assembly with an aeroelastic wind tunnel test or similar analysis shows the damper assembly to prevent damage resulting from environmental wind loading.

9. The method of claim 1, wherein the flexible solar tracker system includes substitute panels.

10. A method of prototyping a solar tracker in a wind tunnel comprising:
    configuring a flexible solar tracker system in a wind tunnel, the flexible solar tracker system having total system damping ratio against row rotation at or greater than critical damping when measured under peak design wind loading and the flexible solar tracker system arranged in a low angle stow position; and in response to said configuring, executing a dynamic loading wind tunnel test on the flexible solar tracker system; and in response to said executing, selecting the total system damping ratio against row rotation based on results of the dynamic loading wind tunnel test.

11. The method of claim 10, further comprising:
determining a total system damping of the flexible solar tracker system when measured under peak design wind loading.

12. The method of claim 10, further comprising:
in response to said executing, modifying structural components of the flexible solar tracker system based on results of the dynamic loading wind tunnel test.

13. The method of claim 10, wherein measurements of loading into a damper assembly with an aeroelastic wind tunnel test or similar analysis shows the damper assembly to prevent damage resulting from an environmental wind loading.

14. The method of claim 10, wherein the flexible solar tracker system includes substitute panels.

15. The method of claim 10, wherein the low angle stow position is less than 20 degrees from horizontal plane.

16. A system comprising:
a flexible solar tracker system having total system damping ratio against row rotation greater than 25% of critical damping when measured under peak design wind loading, wherein total system damping of the flexible solar tracker is predetermined; and a set of panels affixed to the flexible solar tracker and configured in a low angle stow position associated with a dynamic loading wind tunnel test on the flexible solar tracker system.

17. The system of claim 16, wherein the low angle stow position is less than 20 degrees from horizontal plane.

18. The system of claim 1, wherein the total system damping is predetermined based on any of:
a pluck test;
a predictive model; or
previous wind tunnel tests.

19. The system of claim 16, wherein the total system damping ratio is critically damped.

20. The system of claim 16, wherein total system damping ratio is overdamped.

21. The system of claim 16, wherein the set of panels are non-functional, substitute panels.

* * * * *

UNITED STATES PATENT AND TRADEMARK OFFICE
CERTIFICATE OF CORRECTION

PATENT NO. : 11,209,337 B1
APPLICATION NO. : 17/365986
DATED : December 28, 2021
INVENTOR(S) : Needham et al.

Page 1 of 1

It is certified that error appears in the above-identified patent and that said Letters Patent is hereby corrected as shown below:

In the Claims

Claim 18, Column 14, Line 13, after "claim" please delete "1" and insert --"16"--.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*